United States Patent
Otani

(10) Patent No.: US 11,198,333 B2
(45) Date of Patent: Dec. 14, 2021

(54) TIRE FOR TWO-WHEELED AUTOMOTIVE VEHICLE

(71) Applicant: SUMITOMO RUBBER INDUSTRIES LTD., Kobe (JP)

(72) Inventor: Masafumi Otani, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 950 days.

(21) Appl. No.: 15/846,948

(22) Filed: Dec. 19, 2017

(65) Prior Publication Data

US 2018/0236822 A1 Aug. 23, 2018

(30) Foreign Application Priority Data

Feb. 23, 2017 (JP) .............................. JP2017-031688

(51) Int. Cl.
*B60C 13/00* (2006.01)
*B60C 13/04* (2006.01)
*B60C 15/06* (2006.01)

(52) U.S. Cl.
CPC .............. *B60C 13/04* (2013.01); *B60C 15/06* (2013.01); *B60C 2013/006* (2013.01); *B60C 2013/045* (2013.01); *B60C 2015/061* (2013.01); *B60C 2200/10* (2013.01)

(58) Field of Classification Search
CPC ........ B60C 2013/045; B60C 2013/006; B60C 13/00; B60C 13/04; B60C 2013/005; B60C 13/002; Y10T 152/10864
USPC .................................................. 152/525, 555
See application file for complete search history.

(56) References Cited

U.S. PATENT DOCUMENTS

| | | | | |
|---|---|---|---|---|
| 4,284,116 A | * | 8/1981 | Sato | 152/454 |
| 4,706,724 A | * | 11/1987 | Ohkuni | B60C 15/06 152/454 |
| 4,790,363 A | * | 12/1988 | Ingley | 152/454 |
| 7,654,295 B2 | * | 2/2010 | Kasai | 152/525 |
| 2007/0095449 A1 | | 5/2007 | Kasai | |

FOREIGN PATENT DOCUMENTS

| | | | | |
|---|---|---|---|---|
| FR | 2 624 442 A | * | 6/1989 | |
| JP | 2002178724 A | * | 6/2002 | |
| JP | 2008-49799 A | | 3/2008 | |
| JP | 2011073464 A | * | 4/2011 | |

OTHER PUBLICATIONS

English machine translation of JP 2002-178724 A, Jun. 26, 2002.*
English machine translation of JP 2011-73464 A, Apr. 14, 2011.*
Pneumatic Tire, ed. Alan Neville Gent and Joseph D. Walter, US Department of Transportation, Feb. 2006, pp. 6-8.*

* cited by examiner

*Primary Examiner* — Adrienne C. Johnstone
(74) *Attorney, Agent, or Firm* — Birch, Stewart, Kolasch & Birch LLP

(57) ABSTRACT

In a tire 2, each of sidewalls 6 includes a first layer 36 disposed axially outward of a corresponding one of beads 8, and a second layer 38 extending outward from the first layer 36 in a radial direction. When Pc represents a position of an axially outer end of an interface between a carcass 10 and the sidewall 6, an outer end 40 of the first layer 36 is disposed radially inward of the position Pc. A hardness H1 of the first layer 36 is greater than a hardness H2 of the second layer 38. A ratio (H2/H1) of the hardness H2 to the hardness H1 is preferably not less than 0.70 and preferably not greater than 0.95.

9 Claims, 2 Drawing Sheets

TIRE FOR TWO-WHEELED AUTOMOTIVE VEHICLE

This application claims priority on Patent Application No. 2017-031688 filed in JAPAN on Feb. 23, 2017. The entire contents of this Japanese Patent Application are hereby incorporated by reference.

BACKGROUND OF THE INVENTION

Field of the Invention

The present invention relates to tires for two-wheeled automotive vehicles.

Description of the Related Art

During cornering of a two-wheeled automotive vehicle, a heavy load is applied to a side portion of a tire. If the side portion does not have sufficient stiffness, the side portion is significantly deformed due to the load. This reduces reaction force in cornering. Furthermore, when traction is applied, stiffness feeling is reduced. Meanwhile, if the stiffness of the side portion is increased, ground-contact feeling in cornering is impaired.

JP2008-49799 discloses a tire, for a two-wheeled automotive vehicle, which provides good stiffness feeling and also has good absorption. In the tire, the sidewall includes an inner layer which is disposed on an axially inner side, and an outer layer which is disposed on an axially outer side. The complex elastic modulus of the inner layer is less than the complex elastic modulus of the outer layer.

Improvement in the performance of two-wheeled automotive vehicles requires a tire to provide further improved stiffness feeling and ground-contact feeling in cornering.

It is an object of the present invention to provide a tire, for a two-wheeled automotive vehicle, which provides excellent stiffness feeling and ground-contact feeling in cornering.

SUMMARY OF THE INVENTION

A tire, for a two-wheeled automotive vehicle, according to the present invention includes a pair of sidewalls, a pair of beads, and a carcass. The carcass is extended on and between the beads on both sides, along inner sides of the sidewalls. Each of the sidewalls includes a first layer disposed axially outward of a corresponding one of the beads, and a second layer extending almost outward from the first layer in a radial direction. When Pc represents a position of an axially outer end of an interface between the carcass and the sidewall, an outer end of the first layer is disposed inward of the position Pc in the radial direction. A hardness H1 of the first layer is greater than a hardness H2 of the second layer.

The present inventors have studied the structure of the side portion for tires for two-wheeled automotive vehicles, in order to achieve excellent stiffness feeling and ground-contact feeling. As a result, the present inventors have found that the hardness of the sidewall near the bead effectively contributes to tire stiffness feeling, and the flexible deformation of the sidewall in a portion where the carcass is curved outward effectively contributes to tire ground-contact feeling.

In the tire, the sidewall includes the first layer disposed axially outward of the bead, and the second layer which extends radially outward from the first layer. The hardness H1 of the first layer is greater than the hardness H2 of the second layer. The first layer, which is harder, effectively contributes to stiffness feeling. The tire provides excellent stiffness feeling in cornering. Furthermore, in the tire, when Pc represents a position of the axially outer end of the interface between the carcass and the sidewall, the outer end of the first layer is disposed inward of the position Pc in the radial direction. The second layer, which is softer, is disposed in the vicinity of the position Pc where the carcass is curved outward. The second layer, which is softer, effectively contributes to the flexible deformation of the side portion. The second layer effectively contributes to ground-contact feeling. The tire provides good ground-contact feeling.

Preferably, a ratio (H2/H1) of the hardness H2 to the hardness H1 is not less than 0.70 and not greater than 0.95.

Preferably, a ratio ($E^*2/E^*1$) of a complex elastic modulus $E^*2$ of the second layer to a complex elastic modulus $E^*1$ of the first layer is not less than 0.35 and not greater than 0.8.

Preferably, when Po represents a boundary point between the first layer and the second layer on an axially outer side surface of the sidewall, and Pi represents a boundary point between the first layer and the second layer on an axially inner side surface of the sidewall, a height hi from a bead base line to the boundary point Pi is greater than a height ho from the bead base line to the boundary point Po, in the radial direction.

Preferably, a ratio (hi/ho) of the height hi to the height ho is not less than 1.2 and not greater than 3.0.

Preferably, when G represents a height, in the radial direction, from the bead base line to an outer end of a flange of a rim on which the tire is mounted, a ratio (ho/G) of the height ho to the height G is not less than 0.5 and not greater than 1.6.

Preferably, the bead includes a core, and an apex extending radially outward from the core. A distance d between the outer end of the first layer and a tip of the apex is not less than 2 mm.

DESCRIPTION OF THE PREFERRED EMBODIMENTS

The following will describe in detail the present invention based on preferred embodiments with reference where appropriate to the accompanying drawing.

Figure 1:
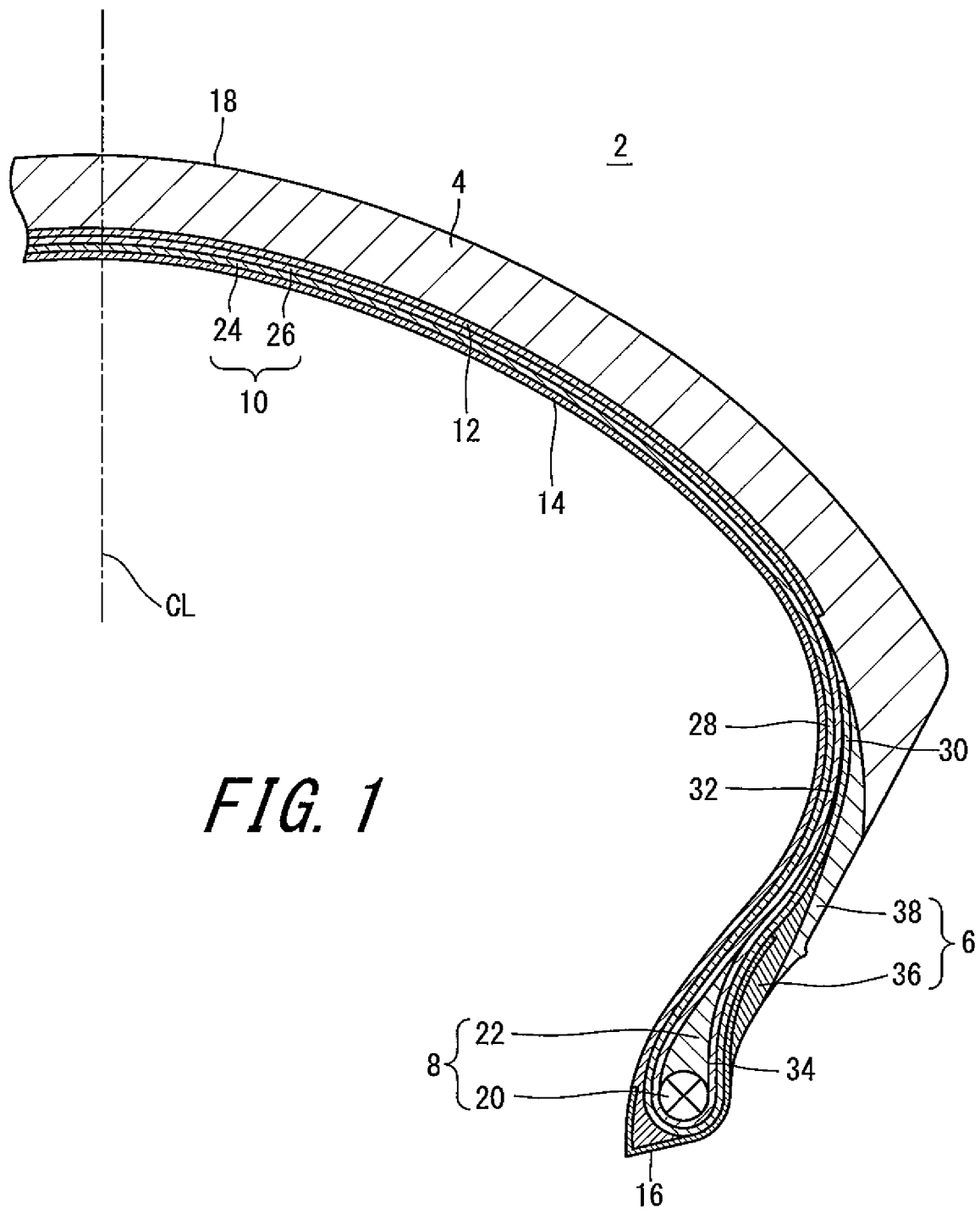
FIG. 1 is a cross-sectional view showing a portion of a pneumatic tire according to an embodiment of the present invention.

FIG. 1 shows a cross-section of a pneumatic tire 2. In FIG. 1, the up-down direction represents the radial direction of the tire 2, the left-right direction represents the axial direction of the tire 2, and the direction perpendicular to the surface of the drawing sheet represents the circumferential direction of the tire 2. The shape of the tire 2 is substantially bilaterally symmetrical about an alternate long and short dash line CL in FIG. 1, except for the tread pattern. The alternate long and short dash line CL represents the equator plane of the tire 2. The tire 2 is mounted to a two-wheeled automotive vehicle. In particular, the tire 2 is mounted to a rear wheel of a two-wheeled automotive vehicle.

The tire 2 includes a tread 4, a pair of sidewalls 6, a pair of beads 8, a carcass 10, a band 12, an inner liner 14, and a pair of chafers 16.

The tread 4 is formed from a crosslinked rubber. The tread 4 has a shape that projects outward in the radial direction. The tread 4 has a tread surface 18. The tread surface 18 comes into contact with a road surface. Grooves may be provided in the tread surface 18 to form a tread pattern, which is not shown.

Each sidewall 6 extends almost inward from the end of the tread 4 in the radial direction. The sidewall 6 is formed from a crosslinked rubber having excellent cut resistance and weather resistance. The sidewall 6 prevents damage to the carcass 10.

Each bead 8 is disposed almost inward of the sidewall 6 in the axial direction. The bead 8 includes a core 20 and an apex 22 that extends outward from the core 20 in the radial direction. The core 20, which is ring-shaped, includes a wound non-stretchable wire. A typical material of the wire is steel. The apex 22 is tapered outward in the radial direction. The apex 22 is formed from a highly hard crosslinked rubber.

The carcass 10 is extended on and between the beads 8 on both sides, along inner sides of the tread 4 and the sidewalls 6. The carcass 10 includes a carcass ply. In the present embodiment, the carcass 10 includes two carcass plies, that is, a first ply 24 and a second ply 26.

The first ply 24 is turned up around the core 20. The first ply 24 includes a first main portion 28 and first turned-up portions 30. The first main portion 28 extends from an axially inner side of one bead 8 to an axially inner side of the other bead 8. The first turned-up portion 30 extends along an axially outer side of the bead 8 almost in the radial direction. The second ply 26 is turned up around the core 20. The second ply 26 includes a second main portion 32 and second turned-up portions 34. The second main portion 32 is disposed outward of the first main portion 28, extending from the axially inner side of one bead 8 to the axially inner side of the other bead 8. The second turned-up portion 34 is disposed between the bead 8 and the first turned-up portion 30, extending almost in the radial direction. The first ply 24 or the second ply 26 may not have a turned-up portion. The carcass 10 may be formed from one carcass ply.

In the present embodiment, an end of the first turned-up portion 30 is disposed radially outward of an end of the second turned-up portion 34. The first turned-up portion 30 is disposed axially outward of the second turned-up portion 34. In the tire 2, the first turned-up portion 30 is in contact with the sidewall 6. In the tire 2, an interface between the first turned-up portion 30 and the sidewall 6 is an interface between the carcass 10 and the sidewall 6.

The first ply 24 and the second ply 26 each include multiple cords aligned with each other and topping rubber, which is not shown. In the present embodiment, an absolute value of an angle of each cord relative to the equator plane is from 65° to 90°. The cords are formed from an organic fiber. Preferable examples of the organic fiber include polyester fibers, nylon fibers, rayon fibers, polyethylene naphthalate fibers, and aramid fibers.

The band 12 is disposed radially inward of the tread 4. The band 12 is disposed radially outward of the carcass 10. The band 12 is layered over the carcass 10. The band 12 includes a cord and topping rubber, which is not shown. The cord is helically wound. The band 12 has a so-called jointless structure. The cord extends substantially in the circumferential direction. An angle of the cord relative to the circumferential direction is not greater than 5°, more preferably not greater than 2°. The band 12 can contribute to the stiffness of the tire 2 in the radial direction. The band 12 may reduce the influence of centrifugal force acting during running. The tire 2 is excellent in high-speed stability. A preferable material of the cord is steel. An organic fiber may be used for the cord. Preferable examples of the organic fiber include nylon fibers, polyester fibers, rayon fibers, polyethylene naphthalate fibers, and aramid fibers.

The inner liner 14 is disposed inward of the carcass 10. The inner liner 14 is joined to the inner surface of the carcass 10. The inner liner 14 is formed from a crosslinked rubber. A rubber having excellent airtightness is used for the inner liner 14. A typical base rubber of the inner liner 14 is an isobutylene-isoprene-rubber or halogenated isobutylene-isoprene-rubber. The inner liner 14 maintains the internal pressure of the tire 2.

Each chafer 16 is disposed near the bead 8. When the tire 2 is mounted on a rim, the chafer 16 is in contact with the rim. By the contact, a portion near the bead 8 is protected. In the present embodiment, the chafer 16 is formed from a fabric and a rubber impregnated into the fabric.

Figure 2:
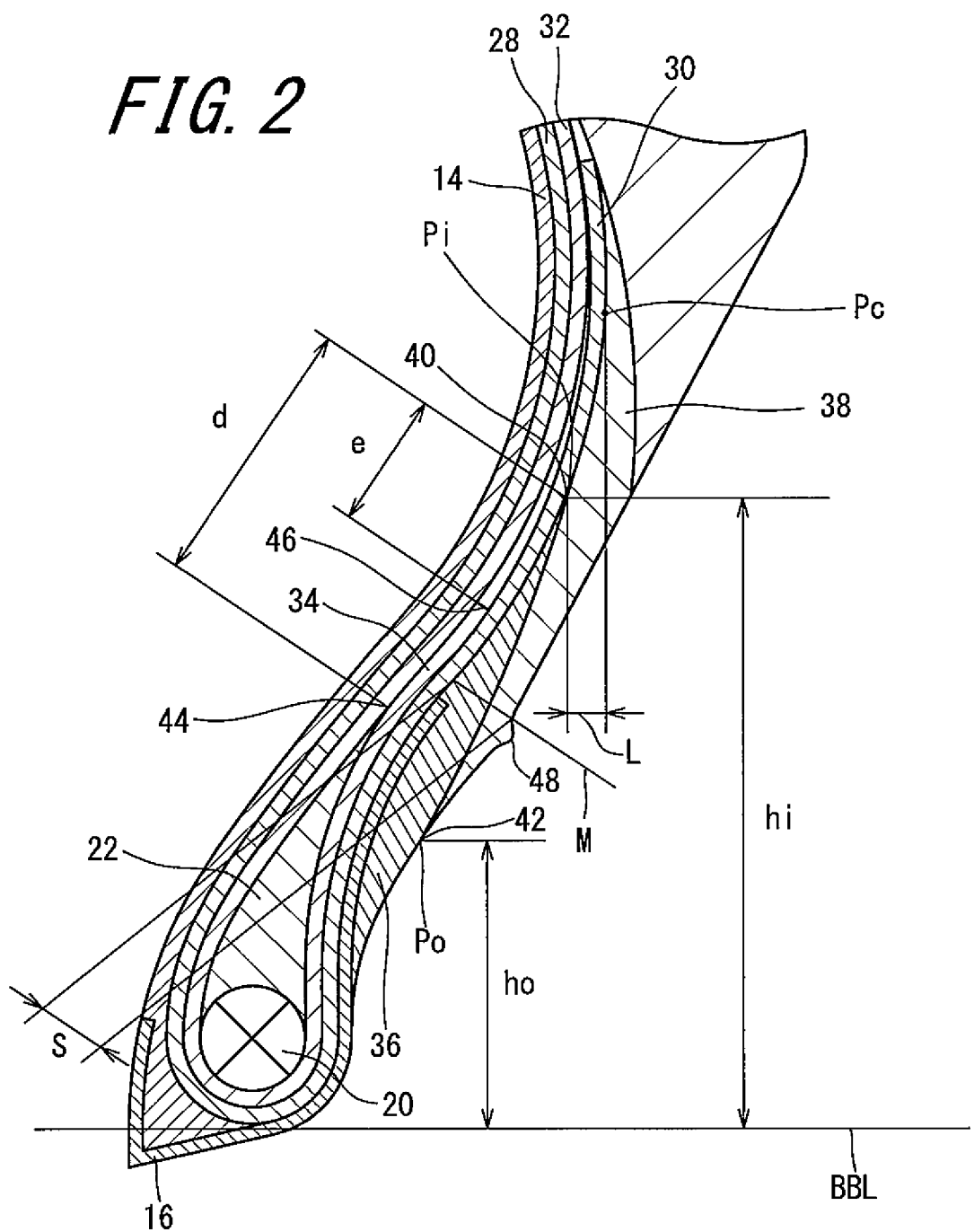
FIG. 2 is an enlarged cross-sectional view showing a portion of the tire in FIG. 1.

FIG. 2 is an enlarged cross-sectional view of the bead 8 portion of the tire 2 in FIG. 1. In FIG. 2, the up-down direction represents the radial direction, the left-right direction represents the axial direction, and the direction perpendicular to the surface of the drawing sheet represents the circumferential direction. In FIG. 2, a solid line BBL represents a bead base line. The bead base line BBL corresponds to a line that defines the rim diameter of a rim (see JATMA). The bead base line BBL extends in the axial direction.

As shown in the drawing, the sidewall 6 includes a first layer 36 and a second layer 38. The first layer 36 is disposed axially outward of the bead 8. The first layer 36 is tapered outward in the radial direction, and is also tapered inward in the radial direction. A radially inner end of the first layer 36 extends to a portion near the core 20. The second layer 38 extends outward from the first layer 36 in the radial direction. In the present embodiment, the second layer 38 extends, outward from an axially outer side of the first layer 36, in the radial direction. The second layer 38 is tapered outward in the radial direction, and is also tapered inward in the radial direction such that the tip 44 of the apex 22 is disposed outward of an innermost end of the second layer 38 in the radial direction. A radially outer end of the second layer 38 is joined to the tread 4. In the tire 2, a hardness H1 of the first layer 36 is greater than a hardness H2 of the second layer 38.

In the present invention, the hardness H1 of the first layer 36 and the hardness H2 of the second layer 38 are measured using a type-A durometer according to the standard of "JIS K6253". The hardnesses are measured by pressing the durometer against the cross-section shown in FIG. 1. The measurement is conducted at a temperature of 23° C.

In FIG. 2, a position Pc is a position on an interface between the carcass 10 and the sidewall 6. In the present embodiment, the position Pc is a position on an interface between the first turned-up portion 30 and the sidewall 6. The position Pc corresponds to an axially outer end of this interface. In the tire 2, an outer end 40 of the first layer 36 is disposed radially inward of the position Pc. In the tire 2, the first layer 36 does not extend up to the position Pc. In the tire 2, the radially outer end 40 of the first layer 36 is disposed axially inward of the position Pc. That is, the carcass 10 is in contact with the second layer 38 in the vicinity of the position Pc.

Advantageous effects of the present invention will be described below.

The present inventors have studied the structure of the side portion for tires for two-wheeled automotive vehicles, in order to achieve excellent stiffness feeling and ground-contact feeling. As a result, the present inventors have found that the hardness of the sidewall near the bead effectively contributes to tire stiffness feeling, and the flexible deformation of the sidewall in a portion where the carcass is curved outward effectively contributes to tire ground-contact feeling.

In the tire 2, the sidewall 6 includes the first layer 36 which is disposed axially outward of the bead 8, and the second layer 38 which extends radially outward from the first layer 36. The hardness H1 of the first layer 36 is greater than the hardness H2 of the second layer 38. The first layer 36, which is harder, effectively supports the side portion against the load applied thereto. The first layer 36 effectively contributes to stiffness feeling. The tire 2 provides excellent stiffness feeling in cornering. Furthermore, the first layer 36, which is harder, contributes to reaction force in cornering. The tire 2 provides excellent reaction force in cornering.

In the tire 2, the radially outer end 40 of the first layer 36 is disposed radially inward of the position Pc which is the axially outer end of the interface between the carcass 10 and the sidewall 6. The first layer 36 does not extend up to the position Pc. The second layer 38, which is softer, is disposed in the vicinity of the position Pc where the carcass 10 is curved outward. The second layer 38, which is softer, effectively contributes to flexible deformation of the side portion. The second layer 38 effectively contributes to ground-contact feeling. The tire 2 provides good ground-contact feeling.

A ratio (H2/H1) of the hardness H2 to the hardness H1 is preferably not greater than 0.95. If the ratio (H2/H1) is not greater than 0.95, the first layer 36 effectively contributes to stiffness feeling. The tire 2 provides excellent stiffness feeling when traction is applied. Furthermore, the first layer 36 effectively contributes to reaction force in cornering. The tire 2 provides excellent reaction force in cornering. From this viewpoint, the ratio (H2/H1) is more preferably not greater than 0.90.

If the hardness of the first layer 36 is excessively great, the difference in hardness between the first layer 36 and the second layer 38 is large. Stress concentrates on the interface between the first layer 36 and the second layer 38. Bending is more likely to occur at the interface between the first layer 36 and the second layer 38. This impairs stiffness feeling when traction is applied in cornering. This may reduce reaction force in cornering.

The ratio (H2/H1) is preferably not less than 0.70. If the ratio (H2/H1) is not less than 0.70, bending at the interface between the first layer 36 and the second layer 38 is reduced. The tire 2 provides excellent stiffness feeling when traction is applied. The tire 2 provides excellent reaction force in cornering. From this viewpoint, the ratio (H2/H1) is more preferably not less than 0.75.

The hardness H1 is preferably not less than 67. If the hardness H1 is not less than 67, the first layer 36 effectively contributes to stiffness feeling. The tire 2 provides excellent stiffness feeling when traction is applied. Furthermore, the first layer 36 effectively contributes to reaction force in cornering. The tire 2 provides excellent reaction force in cornering. From this viewpoint, the hardness H1 is more preferably not less than 69. The hardness H1 is preferably not greater than 80. If the hardness H1 is not greater than 80, the stiffness of the side portion is suitably reduced. The influence of the first layer 36 on ground-contact feeling is reduced. The tire 2 provides good ground-contact feeling. From this viewpoint, the hardness H1 is more preferably not greater than 78.

The hardness H2 is preferably not greater than 65. If the hardness H2 is not greater than 65, the second layer 38 effectively contributes to ground-contact feeling. The tire 2 provides good ground-contact feeling. From this viewpoint, the hardness H2 is more preferably not greater than 63. The hardness H2 is preferably not less than 55. If the hardness H2 is not less than 55, the second layer 38 contributes to stiffness feeling. The tire 2 provides excellent stiffness feeling when traction is applied. Furthermore, the second layer 38 contributes to reaction force in cornering. The tire 2 provides excellent reaction force in cornering. From this viewpoint, the hardness H2 is more preferably not less than 57.

A complex elastic modulus $E^*1$ of the first layer 36 is preferably higher than a complex elastic modulus $E^*2$ of the second layer 38. In this case, the first layer 36 which has a higher complex elastic modulus, effectively contributes to stiffness feeling. The tire 2 provides excellent stiffness feeling in cornering. Furthermore, the first layer 36 which has a higher complex elastic modulus, contributes to reaction force in cornering. The tire 2 provides excellent reaction force in cornering. In addition, the second layer 38 which has a lower complex elastic modulus, effectively contributes to the flexible deformation of the side portion. The second layer 38 effectively contributes to ground-contact feeling. The tire 2 provides good ground-contact feeling.

In the present invention, the complex elastic moduli $E^*1$ and $E^*2$ are measured according to the standard of "JIS K 6394" using a viscoelasticity spectrometer (trade name "VESF-3," manufactured by Iwamoto Seisakusho) under the following measurement conditions.

Initial strain: 10%
Amplitude: ±1.0%
Frequency: 10 Hz
Deformation mode: tension
Measurement temperature: 30° C.

The ratio $(E^*2/E^*1)$ of the complex elastic modulus $E^*2$ to the complex elastic modulus $E^*1$ is preferably not greater than 0.8. If the ratio $(E^*2/E^*1)$ is not greater than 0.8, the first layer 36 effectively contributes to stiffness feeling. The tire 2 provides excellent stiffness feeling when traction is applied. Furthermore, the first layer 36 effectively contributes to reaction force in cornering. The tire 2 provides excellent reaction force in cornering. From this viewpoint, the ratio $(E^*2/E^*1)$ is more preferably not greater than 0.7.

If the complex elastic modulus of the first layer 36 is excessively high, the difference in complex elastic modulus between the first layer 36 and the second layer 38 is large. Stress concentrates on the interface between the first layer 36 and the second layer 38. Bending is more likely to occur at the interface between the first layer 36 and the second layer 38. This impairs stiffness feeling when traction is applied in cornering. This may reduce reaction force in cornering.

The ratio $(E^*2/E^*1)$ is preferably not less than 0.35. If the ratio $(E^*2/E^*1)$ is not less than 0.35, bending at the interface between the first layer 36 and the second layer 38 is reduced. The tire 2 provides excellent stiffness feeling when traction is applied. The tire 2 provides excellent reaction force in cornering. From this viewpoint, the ratio $(E^*2/E^*1)$ is more preferably not less than 0.4.

The complex elastic modulus $E^*1$ is preferably not less than 6.0 MPa. If the complex elastic modulus $E^*1$ is not less than 6.0 MPa, the first layer 36 effectively contributes to stiffness feeling. The tire 2 provides excellent stiffness feeling when traction is applied. Furthermore, the first layer 36 effectively contributes to reaction force in cornering. The tire 2 provides excellent reaction force in cornering. From this viewpoint, the complex elastic modulus $E*1$ is more preferably not less than 6.5 MPa. The complex elastic modulus $E*1$ is preferably not greater than 10.0 MPa. If the complex elastic modulus $E*1$ is not greater than 10.0 MPa, the stiffness of the side portion is suitably reduced. The influence of the first layer 36 on ground-contact feeling is reduced. The tire 2 provides good ground-contact feeling. From this viewpoint, the complex elastic modulus $E*1$ is more preferably not greater than 9.5 MPa.

The complex elastic modulus $E*2$ is preferably not greater than 5.5 MPa. If the complex elastic modulus $E*2$ is not greater than 5.5 MPa, the second layer 38 effectively contributes to ground-contact feeling. The tire 2 provides good ground-contact feeling. From this viewpoint, the complex elastic modulus $E*2$ is more preferably not greater than 5.3 MPa. The complex elastic modulus $E*2$ is preferably not less than 4.0 MPa. If the complex elastic modulus $E*2$ is not less than 4.0 MPa, the second layer 38 contributes to stiffness feeling. The tire 2 provides excellent stiffness feeling when traction is applied. Furthermore, the second layer 38 contributes to reaction force in cornering. The tire 2 provides excellent reaction force in cornering. From this viewpoint, the complex elastic modulus $E*2$ is more preferably not less than 4.2 MPa.

In the tire 2, the first layer 36 which is harder, effectively contributes to stiffness feeling, and therefore, the thickness of the sidewall 6 can be reduced, compared to conventional art. The sidewall 6 which is thin, effectively contributes to the flexible deformation of the side portion. The tire 2 provides good ground-contact feeling. The sidewall 6 which is thin, effectively contributes to a reduction in mass of the tire 2. The tire 2 has a reduced mass.

As shown in FIG. 2, the side portion includes a clincher line 48. A solid line M is a reference line passing through a root, on the radially outer side, of the clincher line 48. The solid line M is normal to the inner surface of the sidewall 6. A double-headed arrow S indicates a thickness of the sidewall 6 as measured along the reference line M. The thickness S is preferably not greater than 2.5 mm. If the thickness S is not greater than 2.5 mm, the sidewall 6 effectively contributes to the flexible deformation of the side portion. The tire 2 provides good ground-contact feeling. The sidewall 6 effectively contributes to a reduction in mass of the tire 2. The tire 2 has a reduced mass. The thickness S is preferably not less than 1.5 mm. If the thickness S is not less than 1.5 mm, the sidewall 6 contributes to stiffness feeling by the tire 2. The tire 2 provides excellent stiffness feeling when traction is applied.

In FIG. 2, Po indicates a point on the axially outer side surface of the sidewall 6. The point Po is a boundary point between the first layer 36 and the second layer 38. In the present embodiment, the boundary point Po coincides with a radially inner end 42 of the second layer 38. In FIG. 2, Pi indicates a point on the axially inner side surface of the sidewall 6. The point Pi is a boundary point between the first layer 36 and the second layer 38. In the present embodiment, the boundary point Pi coincides with the radially outer end 40 of the first layer 36.

In FIG. 2, a double-headed arrow ho indicates a height in the radial direction from the bead base line BBL to the boundary point Po. A double-headed arrow hi indicates a height in the radial direction from the bead base line BBL to the boundary point Pi. In the tire 2, the height hi is preferably greater than the height ho. That is, the first layer 36 is preferably disposed axially inward of the interface between the first layer 36 and the second layer 38. This allows the first layer 36 to effectively contribute to stiffness feeling. The first layer 36 contributes to reaction force in cornering. The tire 2 provides excellent stiffness feeling and reaction force in cornering. Furthermore, the second layer 38, which is disposed axially outward of the first layer 36, effectively contributes to deformation of the side portion. The second layer 38 effectively contributes to ground-contact feeling. The tire 2 provides good ground-contact feeling.

If the height ho is substantially equal to the height hi, the interface between the first layer 36 and the second layer 38 extends almost in the axial direction. The stiffness of the side portion of the tire 2 suddenly changes in the vicinity of the interface. When a load is applied, bending is more likely to occur in the vicinity of the interface. This impairs stiffness feeling when traction is applied in cornering. This may reduce reaction force in cornering.

A ratio (hi/ho) of the height hi to the height ho is preferably not less than 1.2. If the ratio (hi/ho) is not less than 1.2, bending at the interface is effectively reduced. The tire 2 provides excellent stiffness feeling and reaction force in cornering. From this viewpoint, the ratio (hi/ho) is more preferably not less than 2.0. The ratio (hi/ho) is preferably not greater than 3.0. If the ratio (hi/ho) is not greater than 3.0, the influence of the first layer 36 on ground-contact feeling is reduced. The tire 2 provides excellent ground-contact feeling.

G represents a height, in the radial direction, from the bead base line BBL to an outer end of a flange of a rim on which the tire 2 is mounted, which is not shown. A ratio (ho/G) of the height ho to the height G is preferably not less than 0.5. If the ratio (ho/G) is not less than 0.5, the first layer 36 effectively contributes to stiffness feeling. The tire 2 provides excellent stiffness feeling in cornering. Furthermore, the first layer 36 contributes to reaction force in cornering. The tire 2 provides excellent reaction force in cornering. From this viewpoint, the ratio (ho/G) is more preferably not less than 0.7. The ratio (ho/G) is preferably not greater than 1.6. If the ratio (ho/G) is not greater than 1.6, the stiffness of the side portion is suitably reduced. The influence of the first layer 36 on ground-contact feeling is reduced. Furthermore, in this case, the second layer 38 effectively contributes to ground-contact feeling. The tire 2 provides good ground-contact feeling. From this viewpoint, the ratio (ho/G) is more preferably not greater than 1.4.

The height ho is preferably not less than 8 mm. If the height ho is not less than 8 mm, the first layer 36 effectively contributes to stiffness feeling. The tire 2 provides excellent stiffness feeling in cornering. Furthermore, the first layer 36 contributes to reaction force in cornering. The tire 2 provides excellent reaction force in cornering. From this viewpoint, the height ho is more preferably not less than 10 mm. The height ho is preferably not greater than 22 mm. If the height ho is not greater than 22 mm, the stiffness of the side portion is suitably reduced. The influence of the first layer 36 on ground-contact feeling is reduced. Furthermore, in this case, the second layer 38 effectively contributes to ground-contact feeling. The tire 2 provides good ground-contact feeling. From this viewpoint, the height ho is more preferably not greater than 20 mm.

The height hi is preferably not less than 20 mm. If the height hi is not less than 20 mm, the first layer 36 effectively contributes to stiffness feeling. The tire 2 provides excellent stiffness feeling in cornering. Furthermore, the first layer 36 contributes to reaction force in cornering. The tire 2 provides excellent reaction force in cornering. From this viewpoint, the height hi is more preferably not less than 25 mm. The height hi is preferably not greater than 37 mm. If the height hi is not greater than 37 mm, the stiffness of the side portion is suitably reduced. The influence of the first layer 36 on ground-contact feeling is reduced. Furthermore, in this case, the second layer 38 effectively contributes to ground-contact feeling. The tire 2 provides good ground-contact feeling. From this viewpoint, the height hi is more preferably not greater than 35 mm.

In FIG. 2, a double-headed arrow L indicates a distance in the axial direction between the position Pc and the radially outer end 40 of the first layer 36. The distance L is preferably not greater than 10 mm. If the distance L is not greater than 10 mm, the first layer 36 effectively contributes to stiffness feeling. The tire 2 provides excellent stiffness feeling in cornering. Furthermore, the first layer 36 contributes to reaction force in cornering. The tire 2 provides excellent reaction force in cornering. From this viewpoint, the distance L is more preferably not greater than 8 mm. The distance L is preferably not less than 1 mm. If the distance L is not less than 1 mm, the stiffness of the side portion is suitably reduced. The influence of the first layer 36 on ground-contact feeling is reduced. Furthermore, in this case, the second layer 38 effectively contributes to ground-contact feeling. The tire 2 provides good ground-contact feeling. From this viewpoint, the distance L is more preferably not less than 2 mm. In the description herein, the distance L has a positive value when the outer end 40 of the first layer 36 is disposed radially inward of the position Pc. The distance L has a negative value when the outer end 40 of the first layer 36 is disposed radially outward of the position Pc.

When a distance between a tip 44 of the apex 22 and the outer end 40 of the first layer 36 is short, the stiffness of the side portion of the tire 2 suddenly changes in the vicinity of the tip 44 of the apex 22 and the outer end 40 of the first layer 36. When a load is applied, bending is more likely to occur in the vicinity of the tip 44 of the apex 22 and the outer end 40 of the first layer 36. This impairs stiffness feeling when traction is applied in cornering. This may reduce reaction force in cornering.

In FIG. 2, a double-headed arrow d indicates a distance between the tip 44 of the apex 22 and the radially outer end 40 of the first layer 36. The distance d is preferably not less than 2 mm. If the distance d is not less than 2 mm, bending is effectively reduced in the vicinity of the tip 44 of the apex 22 and the outer end 40 of the first layer 36. The tire 2 provides excellent stiffness feeling and reaction force in cornering. From this viewpoint, the distance d is more preferably not less than 5 mm.

If a distance between the end of the turned-up portion of the carcass ply and the outer end 40 of the first layer 36 is short, the stiffness of the side portion of the tire 2 suddenly changes in the vicinity of the end of the turned-up portion of the carcass ply and the outer end 40 of the first layer 36. When a load is applied, bending is more likely to occur in the vicinity of the end of the turned-up portion and the outer end 40 of the first layer 36. This impairs stiffness feeling when traction is applied in cornering. This may reduce reaction force in cornering.

In FIG. 2, a double-headed arrow e indicates the distance between the end of the turned-up portion and the outer end 40 of the first layer 36. If there are a plurality of turned-up portions, the distance e is defined as a distance between the outer end 40 of the first layer 36 and the end of a turned-up portion closest thereto. In the tire 2 in FIG. 2, the distance e is a distance between an end 46 of the second turned-up portion 34 and the outer end 40 of the first layer 36. The distance e is preferably not less than 2 mm. If the distance e is not less than 2 mm, bending is effectively reduced in the vicinity of the end of the turned-up portion and the outer end 40 of the first layer 36. The tire 2 provides excellent stiffness feeling and reaction force in cornering. From this viewpoint, the distance e is more preferably not less than 5 mm.

In the present invention, the dimensions and angles of the tire 2 and the components of the tire 2 are measured in a state where the tire 2 is mounted on a normal rim, and inflated with air to a normal internal pressure. During the measurement, no load is applied to the tire 2. In the description herein, the normal rim represents a rim that is specified according to the standard with which the tire 2 complies. The "standard rim" in the JATMA standard, the "Design Rim" in the TRA standard, and the "Measuring Rim" in the ETRTO standard are included in the normal rim. In the description herein, the normal internal pressure represents an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard, are included in the normal internal pressure.

EXAMPLES

Example 1

A tire, for a two-wheeled automotive vehicle, of example 1 which had the structure shown in FIG. 1 was obtained. The tire had a size of 200/55ZR17. Table 1 indicates the specifications of the tire. In this tire, the outer end of the first layer was disposed inward of the position Pc. That the outer end of the first layer was disposed inward of the position Pc, is indicated by the positive value of the distance L.

Comparative Example 1

A tire of comparative example 1 had a sidewall which did not have two layers. The sidewall had one layer. Therefore, in Table 1, the hardnesses H1 and H2 have the same value. The complex elastic modulus E*1 and the complex elastic modulus E*2 have the same value. In this tire, the thickness S of the sidewall was greater than that of the tire of example 1. The other specifications of this tire were the same as those of the tire of example 1. This tire is a conventional tire.

Comparative Example 2

A tire of comparative example 2 had a sidewall which had the same thickness S as that of example 1. The other specifications of this tire were the same as those of the tire of example 1.

Examples 2 to 4

Tires of examples 2 to 4 were each obtained in the same manner as in example 1 except that the height ho was as indicated in Table 2. Because the height ho was changed, the ratio (hi/ho) and the ratio (ho/G) had values different from those of example 1.

Example 5 and Comparative Example 3

Tires of example 5 and comparative example 3 were each obtained in the same manner as in example 1 except that the heights ho and hi were as indicated in Table 2. Because the heights ho and hi were changed, the ratio (hi/ho), the ratio (ho/G), and the distance d had values different from those of example 1. In comparative example 3, the outer end of the first layer was disposed radially outward of the position Pc. That the outer end of the first layer was disposed radially outward of the position Pc, is indicated by the negative value of the distance L.

[Cornering Ground-Contact Feeling, Cornering Reaction Force, and Traction Stiffness Feeling]

A trial tire was mounted on a standard rim (size=17× MT6.00), and attached as a rear wheel to a two-wheeled automotive vehicle having an engine displacement of 1000 cc. The tire was inflated with air to an internal pressure of 200 kPa. A commercially available tire (size: 120/70ZR17) was attached to a front wheel, and inflated with air to an internal pressure of 200 kPa. The two-wheeled automotive vehicle was caused to run on a circuit course having an asphalt road surface, and sensory evaluation was conducted by a rider. The tire was evaluated in terms of ground-contact feeling in cornering, reaction force in cornering, and stiffness feeling that occurs when traction is applied. The results are represented by index numbers, where the value for comparative example 1 is 100, in Tables 1 and 2 indicated below. The greater the index number is, the better the evaluation is.

TABLE 1

Evaluation Results

|  | Comparative example 1 | Comparative example 2 | Example 1 |
|---|---|---|---|
| Hardness H2 | 60 | 60 | 60 |
| Hardness H1 | 60 | 60 | 72 |
| Ratio (H2/H1) | 1.0 | 1.0 | 0.83 |
| Elastic modulus E*2 [MPa] | 4.6 | 4.6 | 4.6 |
| Elastic modulus E*1 [MPa] | 4.6 | 4.6 | 8.6 |
| Ratio (E*2/E*1) | 1.0 | 1.0 | 0.53 |
| Distance L [mm] | — | — | 4 |
| Height hi [mm] | — | — | 26 |
| Height ho [mm] | — | — | 12 |
| Ratio (hi/ho) | — | — | 2.17 |
| Ratio (ho/G) | — | — | 0.80 |
| Thickness S [mm] | 3 | 2 | 2 |
| Distance d [mm] | — | — | 12 |
| Cornering ground-contact feeling | 100 | 110 | 110 |
| Cornering reaction force | 100 | 90 | 120 |
| Traction Stiffness feeling | 100 | 90 | 120 |

TABLE 2

Evaluation Results

|  | Example 2 | Example 3 | Example 4 | Comparative example 3 | Example 5 |
|---|---|---|---|---|---|
| Hardness H2 | 60 | 60 | 60 | 60 | 60 |
| Hardness H1 | 72 | 72 | 72 | 72 | 72 |
| Ratio (H2/H1) | 0.83 | 0.83 | 0.83 | 0.83 | 0.83 |
| Elastic modulus E*2 [MPa] | 4.6 | 4.6 | 4.6 | 4.6 | 4.6 |
| Elastic modulus E*1 [MPa] | 8.6 | 8.6 | 8.6 | 8.6 | 8.6 |

TABLE 2-continued

Evaluation Results

|  | Example 2 | Example 3 | Example 4 | Comparative example 3 | Example 5 |
|---|---|---|---|---|---|
| Ratio (E*2/E*1) | 0.53 | 0.53 | 0.53 | 0.53 | 0.53 |
| Distance L [mm] | 4 | 4 | 4 | −1 | 8 |
| Height hi [mm] | 26 | 26 | 26 | 45 | 20 |
| Height ho [mm] | 21 | 18 | 10 | 12 | 10 |
| Ratio (hi/ho) | 1.23 | 1.44 | 2.6 | 3.75 | 2.00 |
| Ratio (ho/G) | 1.4 | 1.2 | 0.67 | 0.8 | 0.67 |
| Thickness S [mm] | 2 | 2 | 2 | 2 | 2 |
| Distance d [mm] | 12 | 12 | 12 | 32 | 5 |
| Cornering ground-contact feeling | 100 | 105 | 110 | 80 | 110 |
| Cornering reaction force | 110 | 115 | 105 | 100 | 105 |
| Traction Stiffness feeling | 110 | 115 | 110 | 120 | 105 |

As can be seen from Tables 1 and 2, the tires of the examples are rated higher than the tires of the comparative examples. The evaluation results clearly indicate that the present invention is superior.

The tire described above is applicable to various two-wheeled automotive vehicles.

The foregoing description is in all aspects illustrative, and various modifications can be devised without departing from the essential features of the invention.

What is claimed is:

1. A motorcycle tire, the tire comprising:
a pair of sidewalls;
a pair of beads; and
a carcass,
wherein
the carcass is extended on and between the beads on both sides, along inner sides of the sidewalls,
each of the sidewalls includes a first layer disposed axially outward of a respective one of the beads, and a second layer extending outward from the first layer in a radial direction,
each of the beads includes a core and an apex that extends outward from the core in the radial direction, and the respective first layer is disposed axially outward of the respective apex,
each apex tapers outward in the radial direction to form a tip and the apex tip is disposed outward of an innermost end of the second layer in the radial direction,
when the tire is mounted on a normal rim and inflated with air to a normal internal pressure but with no load applied to the tire, Pc represents a position of an axially outermost end of an interface between the carcass and the respective sidewall, an outermost end of the respective first layer is disposed inward of the position Pc in the radial direction, and
the JIS-A hardness H1 of the respective first layer is greater than the JIS-A hardness H2 of the respective second layer.

2. The tire, for a two-wheeled automotive vehicle, according to claim 1, wherein a ratio (H2/H1) of the hardness H2 to the hardness H1 is not less than 0.70 and not greater than 0.95.

3. The tire, for a two-wheeled automotive vehicle, according to claim 1, wherein a ratio (E*2/E*1) of the complex elastic modulus E*2 of the respective second layer to the complex elastic modulus E*1 of the respective first layer is not less than 0.35 and not greater than 0.8.

4. The tire, for a two-wheeled automotive vehicle, according to claim 1, wherein
when the tire is mounted on a normal rim and inflated with air to a normal internal pressure but with no load applied to the tire, Po represents a boundary point between the respective first layer and the respective second layer on an axially outer side surface of the respective sidewall, and Pi represents a boundary point between the respective first layer and the respective second layer on an axially inner side surface of the respective sidewall,
a height hi from a bead base line to each boundary point Pi is greater than a height ho from the bead base line to each boundary point Po, in the radial direction.

5. The tire, for a two-wheeled automotive vehicle, according to claim 4, wherein a ratio (hi/ho) of the height hi to the height ho is not less than 1.2 and not greater than 3.0.

6. The tire, for a two-wheeled automotive vehicle, according to claim 4, wherein
when the tire is mounted on a normal rim and inflated with air to a normal internal pressure but with no load applied to the tire, G represents a height, in the radial direction, from the bead base line to an outermost end of a respective flange of the rim, a ratio (ho/G) of the height ho to the height G is not less than 0.5 and not greater than 1.6.

7. The tire, for a two-wheeled automotive vehicle, according to claim 1, wherein a distance d between the outermost end of the respective first layer and the tip of the respective apex is not less than 2 mm.

8. A motorcycle tire, the tire comprising:
a pair of sidewalls;
a pair of beads; and
a carcass,
wherein
the carcass is extended on and between the beads on both sides, along inner sides of the sidewalls,
each of the sidewalls includes a first layer disposed axially outward of a respective one of the beads, and a second layer extending outward from the first layer in a radial direction,
each of the beads includes a core and an apex that extends outward from the core in the radial direction, and the respective first layer is disposed axially outward of the respective apex,
each sidewall of the tire includes a clincher line,
when M represents a reference line passing through a root, on the radially outer side, of the respective clincher line and normal to the inner surface of the respective sidewall,
in each sidewall the line M intersects the first layer and the second layer,
a thickness of the respective sidewall as measured along the line M is not less than 1.5 mm and not greater than 2.5 mm,
when the tire is mounted on a normal rim and inflated with air to a normal internal pressure but with no load applied to the tire, Pc represents a position of an axially outermost end of an interface between the carcass and the respective sidewall, an outermost end of the respective first layer is disposed inward of the position Pc in the radial direction, and
the JIS-A hardness H1 of the respective first layer is greater than the JIS-A hardness H2 of the respective second layer.

9. A motorcycle tire, the tire comprising:
a pair of sidewalls;
a pair of beads; and
a carcass,
wherein
the carcass is extended on and between the beads on both sides, along inner sides of the sidewalls,
each of the sidewalls includes a first layer disposed axially outward of a respective one of the beads, and a second layer extending outward from the first layer in a radial direction,
each of the beads includes a core and an apex that extends outward from the core in the radial direction, and the respective first layer is disposed axially outward of the respective apex,
when the tire is mounted on a normal rim and inflated with air to a normal internal pressure but with no load applied to the tire, Pc represents a position of an axially outermost end of an interface between the carcass and the respective sidewall, and an outermost end of the respective first layer is disposed inward of the position Pc in the radial direction,
a respective distance in the axial direction between the position Pc and the radially outermost end of the first layer is not less than 1 mm and not greater than 10 mm, and
the JIS-A hardness H1 of the respective first layer is greater than the JIS-A hardness H2 of the respective second layer.

\* \* \* \* \*